United States Patent [19]
Araki et al.

[11] Patent Number: 5,536,983
[45] Date of Patent: Jul. 16, 1996

[54] LINEAR MOTOR

[75] Inventors: Hirokazu Araki; Hiroyuki Aoyama, both of Saitama, Japan

[73] Assignee: Hitachi Metals, Ltd., Tokyo, Japan

[21] Appl. No.: 224,524

[22] Filed: Apr. 7, 1994

[30] Foreign Application Priority Data

Apr. 8, 1993 [JP] Japan .................................. 5-106254
Jan. 12, 1994 [JP] Japan .................................. 6-014056

[51] Int. Cl.$^6$ .......................... H02K 41/02; H02K 41/00
[52] U.S. Cl. ............................................. 310/12; 318/135
[58] Field of Search .................................. 310/12, 13, 14; 318/135

[56] References Cited

U.S. PATENT DOCUMENTS 5,087,844  2/1992  Takedomi et al. ..................... 310/12

FOREIGN PATENT DOCUMENTS 63-103653  5/1988  Japan .
4-128085  11/1992  Japan .......................... H02K 41/035
4-77547  12/1992  Japan .......................... H02K 41/02
6-054516  2/1994  Japan ......................................... 310/12

Primary Examiner—Steven L. Stephan
Assistant Examiner—Judson H. Jones
Attorney, Agent, or Firm—Sughrue, Mion, Zinn, Macpeak & Seas

[57] ABSTRACT

A plurality of permanent magnets is disposed in a pair of yoke sections so that magnetic poles adjacent to each other and facing each other have opposite polarities. An armature coil is provided in a magnetic gap through which coil a electric current is made to flow to cause its relative movement with respect to the permanent magnets. A linear scale is provided on the stator so as to be located on the thrust center line or in the vicinity thereof, and a read head is provided on the movable member so as to face the linear scale.

7 Claims, 5 Drawing Sheets

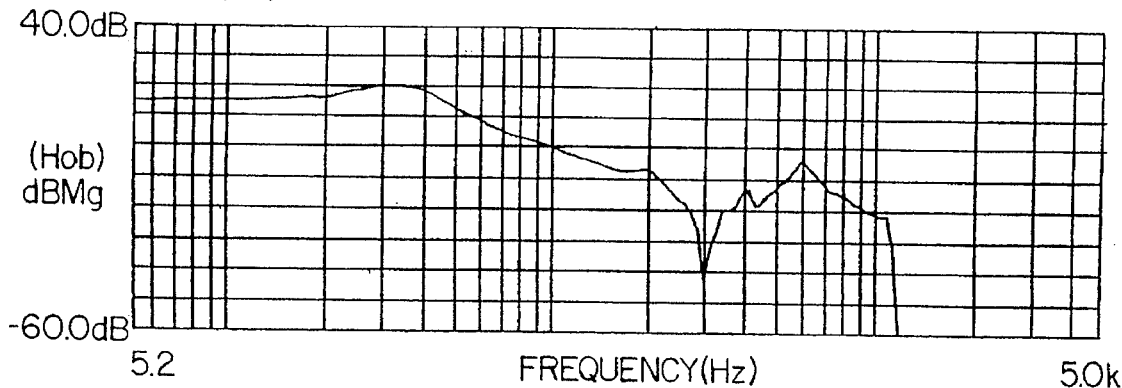
FIG. 4(a)
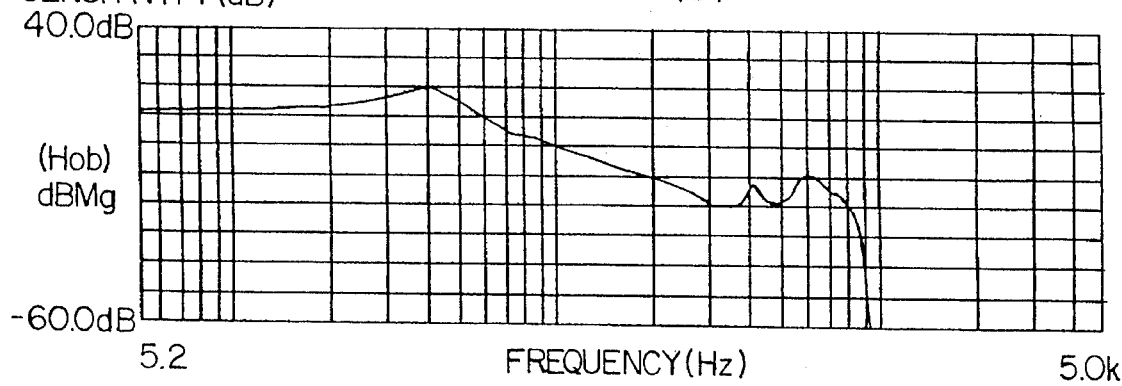
FIG. 4(b)
FIG. 5
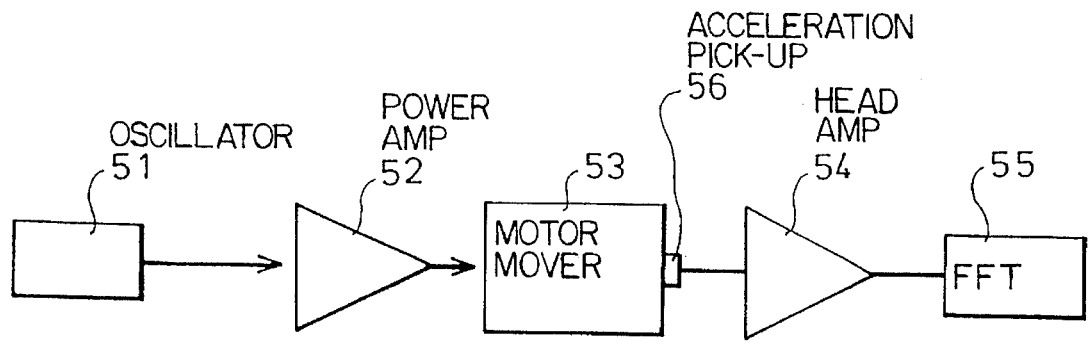

THRUST GENERATION SECTIONS

5,536,983

LINEAR MOTOR

BACKGROUND OF THE INVENTION

The present invention relates to a permanent magnet type linear motor that causes a relative movement between permanent magnets and an armature coil, being able to a highly accurate positioning.

The conventional linear motor has a plurality of permanent magnets arranged in a yoke through a magnetic gap such that magnetic poles adjacent to each other and facing each other have opposite polarities, and an armature coil is provided in the magnetic gap. The relative movement is caused between the permanent magnets and armature coil by supplying a electric current with the armature coil. The above linear motor is classified into the following two types: a moving-coil type in which the permanent magnets are fixed and the armature coil is moved, and a moving-magnet type in which the armature coil is fixed and the permanent magnets are moved.

In the conventional linear motor, as shown in FIG. 10, a position detection means 100 is provided for position control on a movable member 71. The position detection means 100 consists of a read head 72 provided on the movable member 71 and a linear scale 74 provided on a stator 73. For example, the linear scale 74 is constituted such that reflective or opaque graduations are formed in a transparent glass plate at constant intervals, and these graduations are optically read by the read head 72. Related techniques are disclosed in, for instance, Japanese Patent Application Unexamined Publication No. Sho. 61-103653.

In the conventional linear motor, the linear scale 74 is disposed in the end of the stator 73 and the read head 72 is also disposed in the end of the movable member 71 so as to face the linear scale 74. With the position detection means 100 disposed as above, when, for instance, the movable member 71 is inclined during movement, a deviation may occur in the positional relationship between the read head 72 and the linear scale 74, reducing the reading accuracy of the read head 72. In particular, when the stopping accuracy of the movable member 71 must be less than several micrometers, the reduction in reading accuracy becomes a serious problem.

To solve this problem, the movable member 71 could conceivably be made heavier to thereby prevent inclination. However, this would increase the size of the linear motor and also require a larger thrust that would increase power consumption.

SUMMARY OF THE INVENTION

The object of the present invention is to provide a linear motor in which a scale can be read with high accuracy.

To attain the above object, a linear motor according to the invention comprises: at least one pair of yoke section:

a plurality of permanent magnets disposed in the yoke sections via a magnetic gap such that magnetic poles adjacent to each other and facing each other have opposite polarities;

an armature coil provided in the magnetic gap through which coil a electric current is made to flow to cause its relative movement with respect to the permanent magnets;

a scale provided on the stator so as to be located on the thrust center line or in the vicinity thereof; and a reading means provided on the movable member so as to face the scale.

The stator has the yoke sections in which the plurality of permanent magnets is disposed, and the movable member has the armature coil.

Alternatively, the stator has the armature coil, and the movable member has the yoke sections in which the plurality of permanent magnets are disposed.

The linear motor can be constructed such that the scale is erected vertically from the stator and the reading means is disposed so as to read graduations on the erected scale. Another linear motor according to the invention comprises: at least one pair of yoke portions;

a plurality of permanent magnets disposed in the yoke sections via a magnetic gap such that magnetic poles adjacent to each other and facing each other have opposite polarities;

an armature coil provided in the magnetic gap through which coil a electric current is made to flow to cause its relative movement with respect to the permanent magnets;

a scale provided on the movable member so as to be located on the thrust center line or in the vicinity thereof; and a reading means provided on the stator so as to face the scale.

In the above linear motors, thrust is generated in the movable member according to Fleming's left-hand rule. In the moving-magnet type, a reactive force occurs in response to thrust generated in the coil. In the invention, the scale is disposed on the stator (or movable member) so as to be located on the thrust center line or in the vicinity thereof, and the reading means is attached to the movable member (or stator) so as to face the scale. Therefore, even when the movable member is inclined during movement, the deviation in the positional relationship between the reading means and the scale disposed on the stator (or movable member) is small.

When the movable member is inclined for some reason or the movable member itself vibrates, the positional deviation is small in the central portion (smallest at the thrust center) and increases with the distance from the center. Giving attention to this fact, the scale and reading means in the invention are disposed on the thrust center line or in the vicinity thereof. With this configuration, almost no positional deviation occurs between the reading means and scale, improving both the reading accuracy of the reading means and the position control accuracy of the linear motor.

The invention can be applied to both the moving-coil type in which the permanent magnets are fixed and the armature coil is moved and the moving-magnet type in which the armature coil is fixed and the permanent magnets are moved.

Where the linear motor is constructed such that the scale is erected vertically from the stator (the surface of graduations is oriented in the horizontal direction) and the reading means is disposed so as to read the graduations on the erected scale, the reading accuracy of the reading means is further improved.

This is explained as follows: Where the scale is disposed in parallel with the stator (the surface of graduations is oriented upward), dust, etc., may adhere to the scale, making reading inaccurate or impossible in extreme cases. In the invention, the scale is disposed perpendicular to the stator (rotated by 90° and in parallel therewith). With this vertical arrangement, almost no dust, etc., adheres to the scale, enabling more accurate reading.

In the invention, the thrust center means the line that passes through the center of the thrust generation section of the movable member and is perpendicular to the direction of movement of the movable member in any cross-section taken perpendicular to the direction of movement of the movable member.

In the invention, the center of the scale is preferentially located on the thrust center line. However, in practice, no problem occurs if at least one of the scale and reading means overlap with the thrust center line in a sectional view.

BRIEF DESCRIPTION OF THE DRAWINGS

FIGS. 4(a) and 4(b) show frequency characteristics for the linear motors shown in FIGS. 10 and 1, respectively.

FIG. 5 shows the configuration of a measuring instrument used to measure the frequency characteristics in FIGS. 4(a) and 4(b);

DETAILED DESCRIPTION OF THE PREFERRED EMBODIMENTS

Embodiments of the present invention are described with reference to the accompanying drawings.

Figure 1:
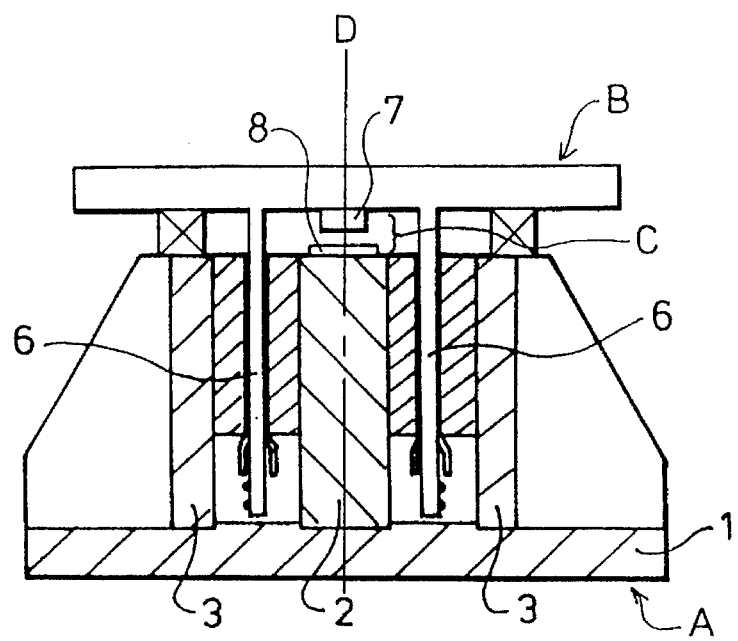
FIG. 1 is a sectional view showing the main part of a linear motor according to an embodiment of the present invention.

FIG. 1 is a sectional view showing the main part of a linear motor according to an embodiment of the present invention. This linear motor is of a type having two thrust generation sections.

Figure 2:
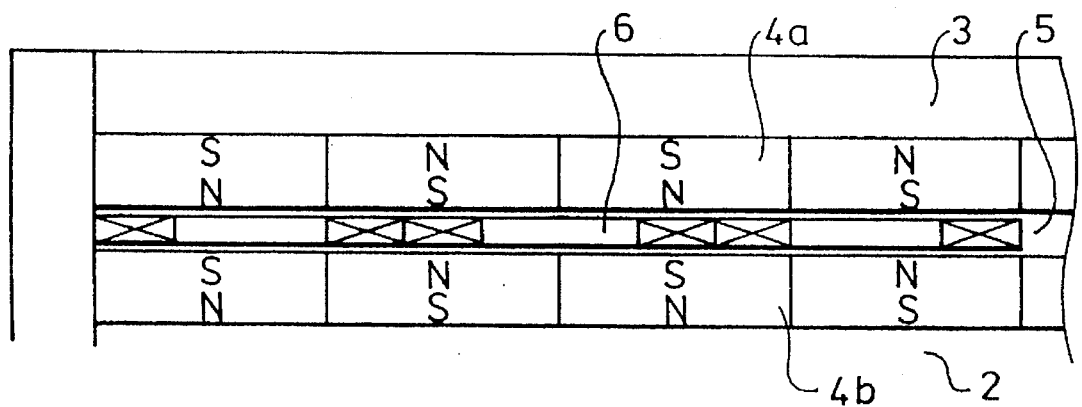
FIG. 2 shows the arrangement of permanent magnets used in the linear motor in FIG. 1.

A central yoke 2 and side yokes 3 are fixed on a base 1. As shown in FIG. 2, a plurality of permanent magnets 4 is provided on the inside walls of the central yoke 2 and side yokes 3 such that adjacent magnetic poles have opposite polarities. Each yoke is made of a ferromagnetic materials such as steel. Further, permanent magnets 4a and 4b facing each other at a predetermined magnetic gap in between also have opposite polarities. A stator A is constituted of the central yoke 2 and side yokes 3, which are fixed on the base 1, and the plurality of permanent magnets 4.

An armature coil 6 constituted of at least one multi-phase coil is placed in the magnetic gap 5. By switching among currents flowing through the respective coils, the armature coil 6 is given a certain thrust and allowed to move in a predetermined direction. Usually, currents flowing through the multi-phase coil of the armature coil 6 are switched based on a detection signal produced by a Hall element (not shown) by detecting magnetic pole polarities. A movable member B having the armature coil 6 is moved when the armature coil 6 is thrust in the above manner.

In the linear motor shown in FIG. 1, since the movable member B has the two armature coils 6, the thrust center is located at the center of the two armature coils 6 as indicated by a line D.

A position detection means C is provided to detect the position of the movable member B, and consists of a read head 7 attached to the movable member B and a linear scale 8 disposed on the stator A in the direction of the arrangement of the permanent magnets 4. The linear scale 8 has reflective or opaque graduations formed on a transparent glass plate at constant intervals, and the read head 7 reads these graduations optically. In this embodiment, the linear scale 8 is disposed on the top surface of the central yoke 2 such that its center is located on the thrust center line D.

In contrast, the read head 7 is attached to the movable member B so as to face the linear scale 8. By placing the linear scale 8 and the read head 7 the thrust center line D, reading can be performed highly accurately even when the movable member B is inclined during movement. This is because, when the movable member B is inclined for some reason or the movable member B itself vibrates, the positional deviation between the read head 7 and linear scale 8 is small in the central portion (smallest at the thrust center D) and increases with the distance from the center.

Figure 3A:
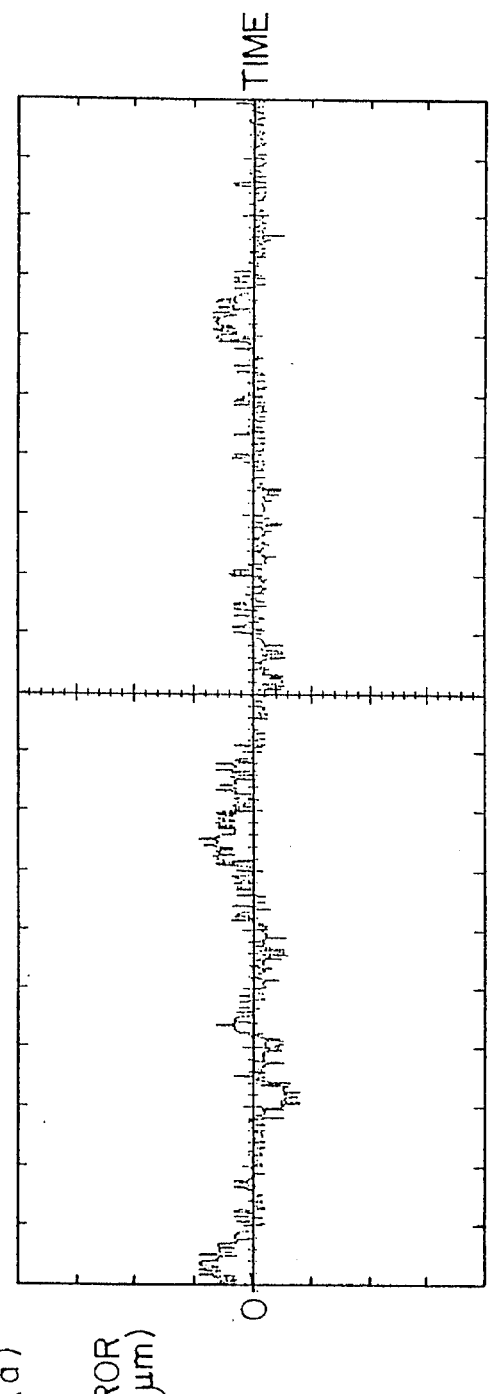
FIGS. 3(a) and 3(b) show error waveforms for the linear motors shown in FIGS. 10 and 1, respectively.
Figure 3B:
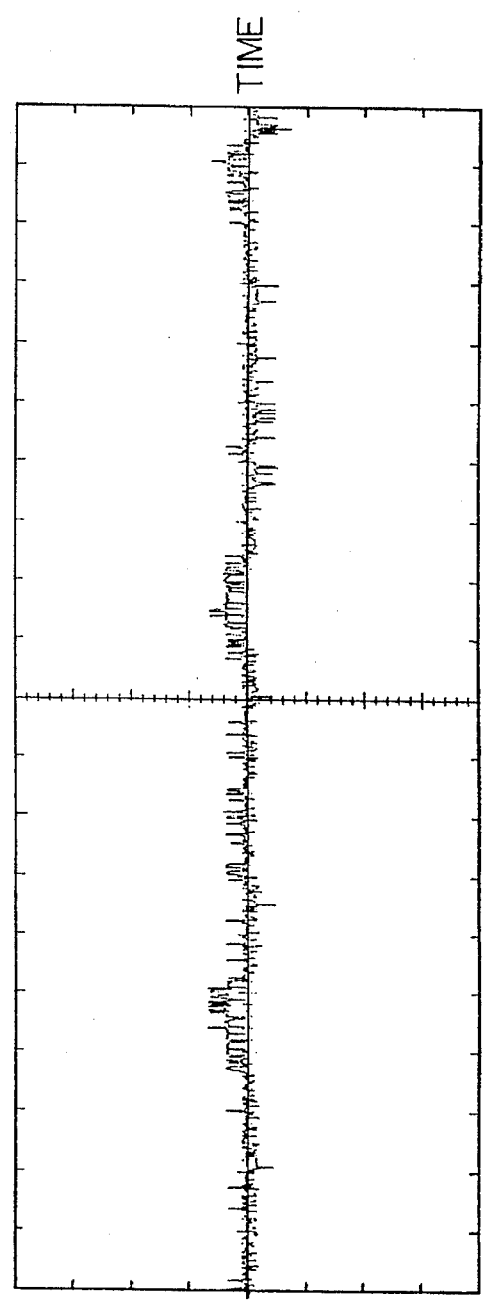
Figure 10:
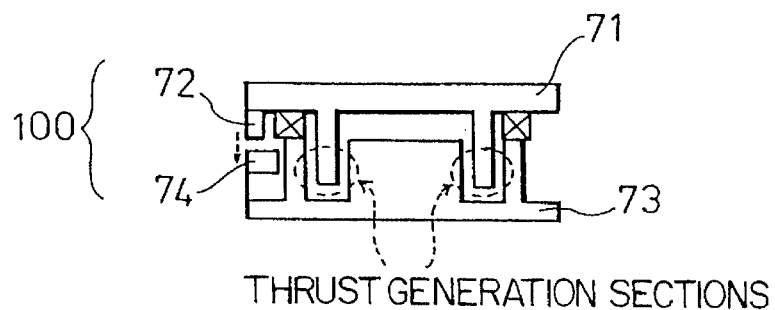
FIG. 10 is a sectional view showing the main part of a conventional linear motor.

This will be apparent from experimental results shown in FIGS. 3(a) and 3(b), where the horizontal axis represents time and the vertical axis represents error (in units of 0.1 μ m) from an appointed position. FIG. 3(a) shows a distribution of the output signal when the linear scale 74 is disposed in the end of the stator 73 as shown in FIG. 10. FIG. 3(b) shows a distribution of the output signal when the linear scale 8 is disposed on the thrust center line D. It is seen from FIG. 3(a) that the amplitude of the output signal, i.e., error, is large in the case where the linear scale 74 is disposed in the end of the stator 73 (FIG. 10). This means that reading accuracy deteriorates with the positional deviation between the read head 72 and linear scale 74 or vibration occurs in the movable member 71 itself.

In contrast, it is seen from FIG. 3(b) that the amplitude of the output signal is relatively small, i.e., error is small in the case where the linear scale 8 is placed on the thrust center line D (FIG. 1). This means that reading accuracy is high due to the small positional deviation between the read head 7 and linear scale 8. That is, it is understood from the above experimental results that, where the linear scale 8 is placed on the thrust center line D as shown in FIG. 1, error is small (positional deviation is small) and reading accuracy is improved.

FIGS. 4(a) and 4(b) show the relationships (frequency-gain characteristics) between the frequency and sensitivity of movement data with respect to a movement instruction input to the moving coil (armature coil 6) shown in FIGS. 10 and 1, respectively. These frequency characteristics were measured by using the measuring instrument shown in FIG. 5. In FIG. 5, reference numeral 51 denotes an oscillator, 52 a power amplifier, 53 a movable member having an acceleration pickup 56, 54 a head amplifier, and 55 a fast Fourier transform (FFT) device.

Using the above measuring instrument, the frequency (f) was varied from 5 Hz to 5 kHz with input voltage ($V_{in}$) fixed at 2 V. Under this condition, output voltage ($V_{out}$) of the head amplifier 54 was measured by the fast Fourier transform device 55. Sensitivity (G) was determined according to the following equation based on measurement results thus obtained:

$$G\ (f{:}5\ Hz\text{–}5\ kHz) = V_{out}\ (f{:}5\ Hz\text{–}5\ kHz)/V_{in}\ (2\ V\ \text{constant})$$

where;

G: sensitivity (dB)

f: frequency (Hz)

V: voltage

FIGS. 4 shows the relationship between sensitivity (G) and frequency obtained using the above equation. As shown in FIG. 4(a), in the conventional case (see FIG. 10), sensitivity drops due to strong mechanical resonance at a frequency of about 300 Hz. In contrast, as shown in FIG. 4(b), in the linear motor of the invention (see FIG. 1), sensitivity does not drop due to mechanical resonance at a frequency of about 300 Hz and, in fact, decreases only above 1 kHz. That is, the invention enables highly accurate reading without causing a resonance phenomenon even in a high frequency range.

Table 1 shows the particulars for the linear motors used in the above measurement experiments.

TABLE 1

| Stroke | 700 mm |
| --- | --- |
| Stator | |
| Width of magnetic gap | 8 mm |
| Magnetic flux density in gap | 7000 Gauss |
| Movable member | |
| Coil | 3 phases 36 turns × 12 |
| Input current | 8 ampere |
| Thrust | 300 Newton |

Although the embodiment in FIG. 1 is of the type (moving-coil) in which the permanent magnets 4 are fixed and the armature coil 6 is moved, the invention is not limited to this case, but can be applied to a linear motor of the type (moving-magnet) in which the armature coil 6 is fixed and the permanent magnets are moved.

Another embodiment of the invention is described next.

While the embodiment in FIG. 1 is directed to the linear motor having two thrust generation sections, the invention is not limited to such a case, but can be applied to a linear motor of the type having a single thrust generation section.

Figure 6:
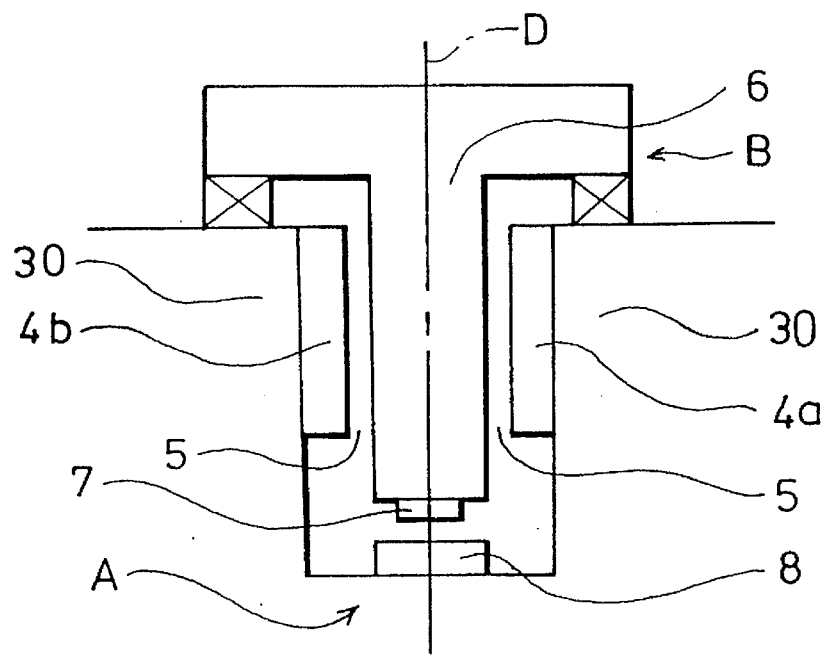
FIG. 6 shows a moving-coil linear motor according to another embodiment of the invention.

FIG. 6 shows a moving-coil linear motor in which permanent magnets 4 are fixed and the armature coil 6 is moved. A plurality of permanent magnets 4 is disposed inside a yoke 30, and the armature coil 6 is disposed in a magnetic gap 5. The armature coil 6 is moved in a predetermined direction when given a certain thrust caused by a electric current flowing through it. The linear scale 8 is disposed on the thrust center line D of the stator A having the permanent magnets 4. In contrast, the read head 7 is attached to the movable member B having the armature coil 6 so as to face the linear scale 8.

Figure 7:
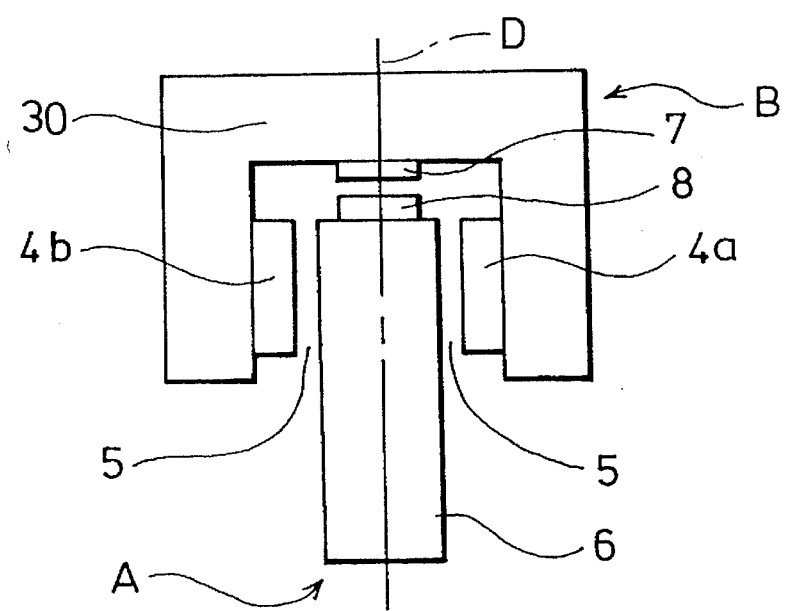
FIG. 7 shows a moving-magnet linear motor according to another embodiment of the invention.

FIG. 7 shows a linear motor according to another embodiment which is also of the type having a single thrust generation section.

This linear motor is of the moving-magnet in which an armature coil 6 is fixed and the permanent magnets 4 are moved. A linear scale 8 is disposed on the top surface of the stator A so as to be located on the thrust center line D of the movable member B. In contrast, the read head 7 is attached to the movable member B having the permanent magnets 4 so as to face the linear scale 8.

A further embodiment of the invention is described next with reference to FIG. 8.

A linear scale 8 is erected vertically from the stator A, and the read head 7 is positioned so as to read graduations of the linear scale 8 thus erected. According to this embodiment, by virtue of the vertical orientation (rotated by 90° of the linear scale 8, dust, etc., can be prevented from adhering to the linear scale 8, enabling more accurate reading.

Figure 8:
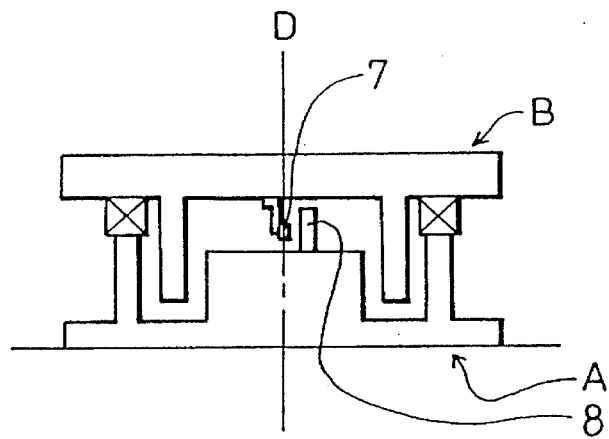
FIG. 8 shows a linear motor according to still another embodiment of the invention.

In the linear motor shown in FIG. 8, the thrust center is indicated by the line D as in the case of FIG. 1, and the linear scale 8 is somewhat spaced from the thrust center D.

Figure 9:
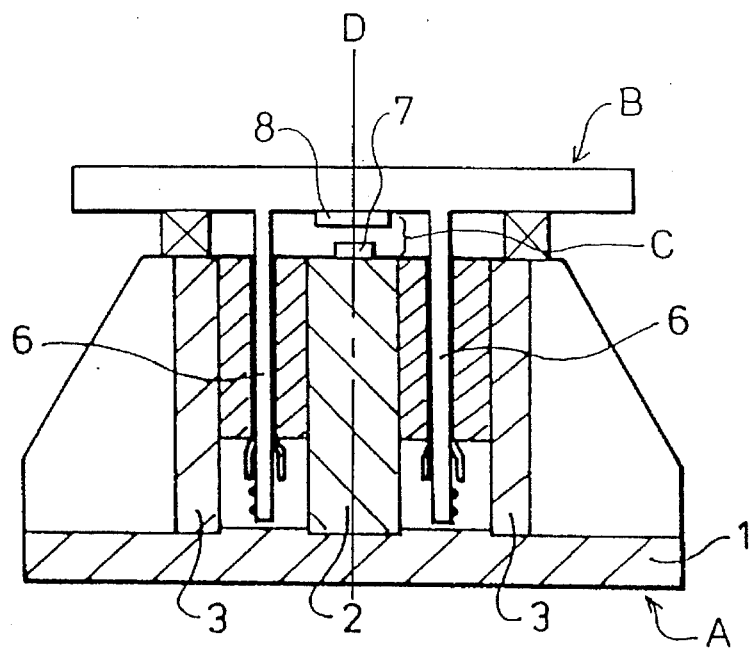
FIG. 9 shows a linear motor according to still a further embodiment of the invention.

In the embodiment in FIG. 1, the linear scale 8 is disposed on the stator A and the read head 7 is attached to the movable member B, and reading is performed as the read head 7 moves along the fixed linear scale 8. As shown in FIG. 9, a reverse configuration is also possible in which the read head 7 is disposed on the stator A and the linear scale 8 is attached to the movable member B, and the linear scale 8 is moved along the fixed read head 7.

According to the above embodiments, since the reading means and the scale are disposed on the thrust center line or in the vicinity thereof, almost no positional deviation occurs between the reading means and the scale, improving the reading accuracy. Further, by disposing the scale so as to be erected from the stator, dust, etc., can be prevented from adhering to the scale, enabling more accurate reading.

What is claimed is:

1. A linear motor comprising:

at least one pair of yoke sections;

a plurality of permanent magnets disposed in said yoke sections via a magnetic gap such that the magnetic poles adjacent to each other and facing each other have opposite polarities; an armature coil provide in said magnetic gap through which coil an electric current is made to flow to cause its relative movement with respect to said permanent magnets; and a scale provided on a stator, and a reading means provided on the movable member so as to face said scale vertically; with the scale and/or the reading member provided on the thrust center line.

2. The linear motor according to claim 1, wherein said stator has said yoke sections in which said plurality of permanent magnets is disposed, and said movable member has said armature coil.

3. The linear motor according to claim 1, wherein said stator has said armature coil, and said movable member has said yoke sections in which said plurality of permanent magnets is disposed.

4. A linear motor comprising at least one pair of yoke sections;

a plurality of permanent magnets disposed in said yoke sections via magnetic gap such that the magnetic poles adjacent to each other and facing each other have opposite polarities;

an armature coil provided in said magnetic gap through which coil an electric current is made to flow to cause its relative movement with respect to said permanent magnets; and a scale erected vertically from the stator, and a reading means disposed on the movable member so as to read graduations of said erected scale, with the scale and/or the reading member provided on the thrust center line.

5. A linear motor comprising:

at least one pair of yoke sections:

a plurality of permanent magnets disposed in said yoke sections via a magnetic gap such that the magnetic poles adjacent to each other and facing each other have opposite polarities;

an armature coil provided in said magnetic gap through which coil an electric current is made to flow to cause its relative movement with respect to said permanent magnets; and a scale provided on the movable member, and a reading means provided on the stator so as to face said scale vertically, with the scale and/or the said reading member provided on the thrust center line.

6. A linear motor comprising:

a stator comprising:

a central yoke disposed at the center of the base; first and second side yokes disposed on both sides of said central yoke;

a first permanent magnet assembly comprising a plurality of permanent magnets disposed on inside walls of said first side yoke and said central yoke through a first magnetic gap such that the magnetic poles adjacent to each other and facing each other have opposite polarities; and a second permanent magnet assembly comprising a plurality of permanent magnets disposed on inside walls of said second side yoke and said central yoke through a second magnetic gap such that the magnetic poles adjacent to each other and facing each other have opposite polarities;

a movable member comprising:

a first armature coil provided in said first magnetic gap through which coil an electric current is made to flow to cause its relative movement with respect to said first permanent magnet assembly; and a second armature coil provided in said second magnetic gap through which coil an electric current is made to flow to cause its relative movement with respect to said second permanent magnet assembly; and a scale disposed on the top surface of said center yoke of said stator, and a reading means disposed on said movable member so as to the face said scale vertically, and the scale and/or the reading member is provided on the thrust center line.

7. A linear motor comprising:

a stator comprising:

a central yoke disposed at the center of the base;

first and second side yokes disposed on both sides of said central yoke;

a first permanent magnet assembly comprising a plurality of permanent magnets disposed on inside walls of said first side yoke and said central yoke through a first magnetic gap such that the magnetic poles adjacent to each other and facing each other have opposite polarities; and a second permanent magnet assembly comprising a plurality of permanent magnets disposed on inside walls of said second side yoke and said central yoke through a second magnetic gap such that the magnetic poles adjacent to each other and facing each other have opposite polarities;

a movable member comprising:

a first armature coil provided in said first magnetic gap through which an electric current is made to flow to cause its relative movement with respect to said first permanent magnet assembly; and a second armature coil provided in said second magnetic gap through which an electric current is made to flow to cause its relative movement with respect to said second permanent magnet assembly;

a reading means disposed on the top surface of said center yoke of said stator, and a scale disposed on said movable member so as to face said reading means vertically; and the scale and/or the reading member is provided on the thrust center line.

* * * * *